US009143510B2

(12) United States Patent
Begorre et al.

(10) Patent No.: US 9,143,510 B2
(45) **Date of Patent: *Sep. 22, 2015**

(54) SECURE IDENTIFICATION OF INTRANET NETWORK

(71) Applicant: Microsoft Corporation, Redmond, WA (US)

(72) Inventors: Bill Begorre, Redmond, WA (US); Deon C. Brewis, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/096,010

(22) Filed: Dec. 4, 2013

(65) Prior Publication Data

US 2014/0096211 A1 Apr. 3, 2014

Related U.S. Application Data

(63) Continuation of application No. 11/788,210, filed on Apr. 19, 2007, now Pat. No. 8,635,680.

(51) Int. Cl.

| | |
|---|---|
| ***G06F 7/04*** | (2006.01) |
| ***H04L 29/06*** | (2006.01) |
| *H04L 29/12* | (2006.01) |

(52) U.S. Cl.

CPC ........ *H04L 63/0876* (2013.01); *H04L 63/1466* (2013.01); *H04L 29/12594* (2013.01); *H04L 61/30* (2013.01); *H04L 63/126* (2013.01)

(58) Field of Classification Search

CPC ............ H04L 63/0876; H04L 63/1466; H04L 29/12594; H04L 61/30

USPC ............................................................. 726/6

See application file for complete search history.

(56) References Cited

U.S. PATENT DOCUMENTS

| | | | |
|---|---|---|---|
| 5,966,705 | A | 10/1999 | Koneru |
| 6,393,484 | B1 | 5/2002 | Massarani |

(Continued)

FOREIGN PATENT DOCUMENTS

| | | |
|---|---|---|
| WO | WO 2004/025926 | 3/2004 |
| WO | WO 2006/082296 | 8/2006 |

OTHER PUBLICATIONS

Microsoft (Jul. 2004). Longhorn Network Location Awareness Service. Retrieved Jan. 29, 2015 from https://msdn.microsoft.com/en-us/library/aa480195.aspx.*

(Continued)

*Primary Examiner* — Brian Shaw

(74) *Attorney, Agent, or Firm* — Timothy Churna; Kate Drakos; Micky Minhas

(57) ABSTRACT

A method is provided for network identification based on high entropy data on a network which are not easily guessed or obtained outside the network, which can prevent an attacker from "spoofing" the network. A component in a client computer connected to a network may obtain over the network a network data block including device identification information of a device controlling the network. Upon parsing the network data block, such high entropy data as unique device identifiers may be obtained from the device identification information. Depending on availability of the unique device identifiers and authentication history of the client computer, different combinations of the unique device identifiers and/or other identification information may be used to generate a unique network identifier such as a network signature. The component may provide the network signature to applications within the client computer.

20 Claims, 7 Drawing Sheets

(56) References Cited

U.S. PATENT DOCUMENTS

| | | | | |
|---|---|---|---|---|
| 6,466,986 | B1 | 10/2002 | Sawyer | |
| 6,823,453 | B1 | 11/2004 | Hagerman | |
| 6,993,588 | B2 | 1/2006 | Davis | |
| 7,096,266 | B2 | 8/2006 | Lewin | |
| 2002/0010869 | A1 | 1/2002 | Kim | |
| 2003/0191953 | A1 | 10/2003 | Pandit | |
| 2004/0162786 | A1 * | 8/2004 | Cross et al. | 705/59 |
| 2004/0193707 | A1 | 9/2004 | Alam | |
| 2004/0210649 | A1 | 10/2004 | Bhogal | |
| 2004/0210767 | A1 | 10/2004 | Sinclair | |
| 2004/0213172 | A1 | 10/2004 | Myers | |
| 2004/0215649 | A1 | 10/2004 | Whalen | |
| 2005/0005110 | A1 | 1/2005 | Kim | |
| 2005/0005233 | A1 | 1/2005 | Kays | |
| 2005/0086473 | A1 | 4/2005 | Barkley | |
| 2006/0218403 | A1 | 9/2006 | Sauve | |
| 2006/0230272 | A1 | 10/2006 | Lawrence | |
| 2007/0130286 | A1 | 6/2007 | Hopmann | |
| 2007/0180082 | A1 | 8/2007 | Abraham | |
| 2008/0072301 | A1 | 3/2008 | Chia | |
| 2009/0019141 | A1 | 1/2009 | Bush | |

OTHER PUBLICATIONS

Butti (2006). Machine Translation of WO 2006/082296.

Microsoft TechNet, "Force Domain Controller Removal:Active Directory", Mar. 2, 2005.

AppendixK_2006 (Dec. 3, 2006). Appendix K: Network Connectivity Status Indicator and Resulting, Retrieved Apr. 22, 2013 from technet.microsoft.com.

Ateniese, "A New Approach to DNS Security (DNSSEC)", Nov. 5-8, 2001, pp. 86-95.

Lioy, "DNS Security", May 22-25, 2000. pp. 1-13.

Molva, "Internet Security Architecture", Apr. 23, 1999, 14 pages.

TREND Micro, "Trend Micro Internet Security 2007", Apr. 17, 2007.

* cited by examiner

SECURE IDENTIFICATION OF INTRANET NETWORK

RELATED APPLICATIONS

This Application is a Continuation of and claims benefit from U.S. patent application Ser. No. 11/788,210 that was filed on Apr. 19, 2007, and that is incorporated herein by reference in its entirety.

BACKGROUND

When a client computing system is connecting to a network (e.g., an intranet network), identification of the network is typically performed. The network identification provides information on which network the client computing system is connected to and is used by the computing system to select resources, such as, for example, applications, services and devices included in the network. Network identification is also required by various applications and services included in the client computing system, such as firewalls, which may communicate with devices external to the system differently, depending on whether the network is a secure or unsecured network.

Conventionally, network identification is based on a domain name system (DNS) suffix of a network, which may be obtained from a network device that controls the network. However, the DNS suffix can be relatively easily guessed, in which case the client computing system may become vulnerable to a "spoofing" attack. By this attack, when the client computing system is connected to an unsecured network, a secure network (e.g., a secure corporate network) may be "spoofed" by using its network identifier based on the DNS suffix to identify the unsecured network as a secure network. The client computing system may then operate as if it were connected to the secure network and a user may unknowingly take actions that may compromise the user's identity or a security of the client computing system.

SUMMARY OF INVENTION

Network identification, particularly, an intranet network identification, may be performed by utilizing high entropy data associated with the network, which is neither easily guessed nor obtainable outside the network. The high entropy data may be device identification information of a device controlling a network (e.g., a domain controller) including unique device identifiers.

The device identification information may be obtained by parsing a network data block obtained by a client computer over the network. The device identification information may depend on the unique device identifiers available. Therefore, depending on the availability of the unique device identifiers and authentication history of the client computer, a unique network identifier (e.g., a network signature) may be generated by a component in the client computer to identify the network from one or more of the unique device identifiers and, in some embodiments, other information. A hash function may be used to generate the unique network identifier. The generated unique network identifier may be provided to other components in the client computer.

Because the unique device identifiers have high entropy characteristics, they may not be guessed by or obtained outside the network by an attacker. Therefore, the network may not be easily "spoofed."

In one aspect, the invention provides a method of operating a component in a client computer connected to a network. According to the method, device identification information of a device controlling the network is obtained. The method also includes generating a unique network identifier from the device identification information and providing the unique network identifier as an output identifying the network.

In another aspect, the invention provides a computer-readable medium having computer-executable instructions for performing a method of operating a component in a client computer connected to a network. The method comprises obtaining device identification information of a device controlling the network, generating a unique network identifier from the device identification information, and providing the unique network identifier as an output identifying the network.

In yet another aspect, the invention provides a system for use in a client computer connected to a network. The system comprising a computer-readable medium having a component comprising computer-executable instructions that, when executed, perform a method of operating the client computer. The method comprises obtaining device identification information of a device controlling the network, generating a unique network identifier from the device identification information, and providing the unique network identifier as an output identifying the network.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a network can be identified using unique high entropy data associated with a network, which is not easily guessed or obtainable outside the network. This complicates and may preclude "spoofing" the network by a malicious attacker. The high entropy data may be derived from device identification information that can be obtained, upon a request, by a client computer connected to the network from a device controlling the network (e.g., a domain controller). The device identification information as well as other information may be obtained by parsing a network data block obtained by the client computer over the network. Examples of the device identification information include unique device identifiers, such as a root domain globally unique identifier (Root Domain GUID) and a domain globally unique identifier (Domain GUID).

The inventors have further appreciated that a unique network identifier used to identify the network can be generated by combining such device identification information using a function (e.g., a hash function). Depending on the availability of the unique device identifiers and authentication history of the client computer, the unique network identifier (e.g., a network signature) may be generated from one or more of the unique device identifiers and may also include other information.

A network signature may be generated when the client computer connects to a network. Any change in network characteristics also may result in generating a new network signature and, consequently, identification of a new network. The generated network signature may be provided to an operating system, applications, or other components within the client computer requiring knowledge of the signature and may optionally be stored in an encrypted format for future use.

Figure 1A:
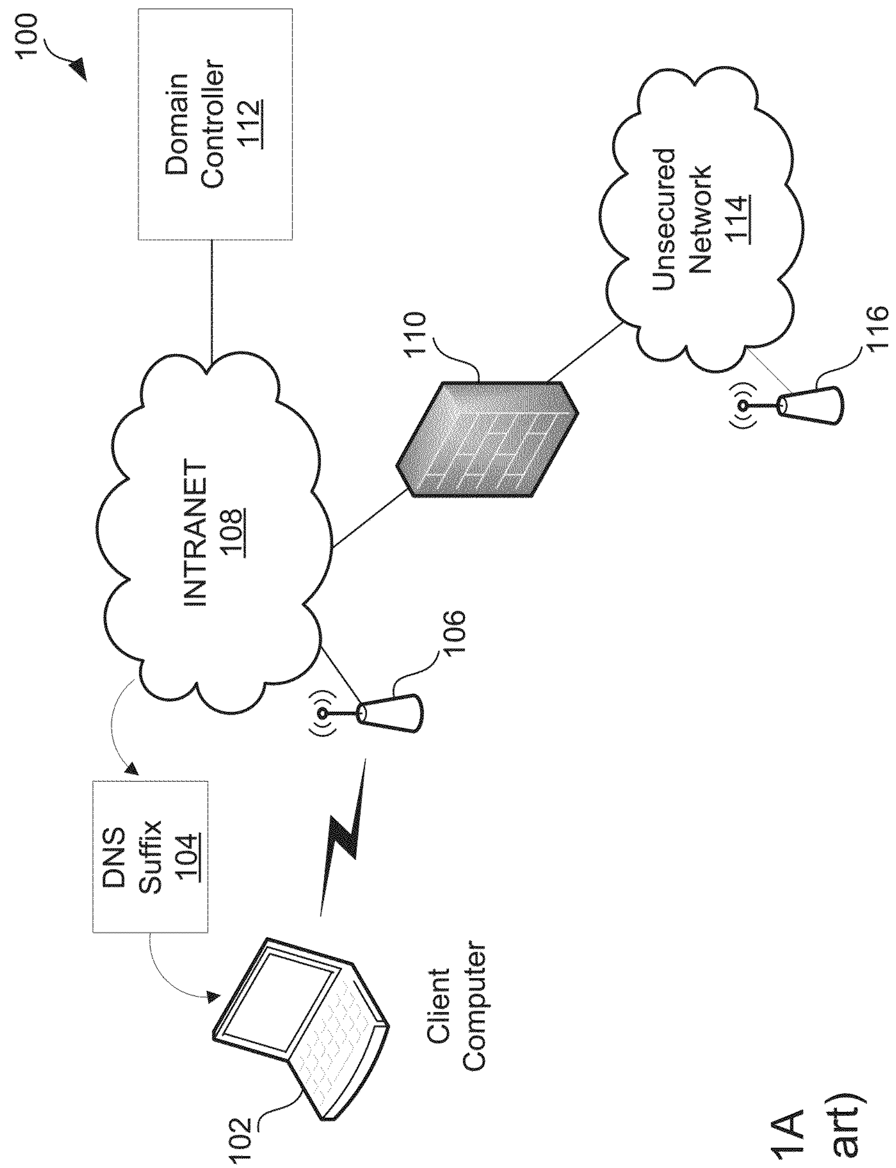
FIG. 1A is a schematic diagram illustrating a system utilizing prior art network identification.

FIG. 1A is a schematic diagram of a system 100 utilizing network identification. A client computer 102 is connected, via an access point or a network access server 106, to a network, which may be wireless or wired and is shown by way of example only and not to limit the scope of the invention as an intranet 108. An intranet may be defined as a private computer network characterized by an access restricted to users of the intranet. For example, while employees of an organization may have an unlimited access to the intranet, other parties, such as customers, partners and vendors, may have restricted or no access to the intranet.

Access to the secure intranet 108 may be protected from an unsecured network 114 and any other network by a firewall 110, which may be implemented in any suitable way. Computing devices connected to the intranet 108 behind the firewall 110 may behave differently from computing devices outside the intranet 108.

In the example illustrated, an access point 116 is associated with the unsecured network 114. The unsecured network 14 may be any network outside the intranet 108.

The intranet 108 may be controlled by a domain controller 112, which may be a server spanning one or more computing devices that contain information, including logon information, on the client computer 102 and any other devices and systems and their users on the intranet 108. A client computer or any other device connected to an intranet may or may not be domain-joined. To be trusted within a domain and to communicate with other devices encompassed by the domain, a domain-joined client computer needs to be authenticated with a domain controller controlling the domain by exchanging credentials. The domain controller may push down and enforce security policies applied to the domain-joined client computer and thus control the client computer. A domain may be controlled by one or more domain controllers. If a client computer is non-domain-joined (e.g., a customer having a guest account visits the domain), the client computer may not access some domain resources and no authentication is required for the client computer to connect to the domain.

When the client computer 102 is connected to the intranet 108, the domain controller 112 may provide device identification information, such as, for example, a domain name system (DNS) suffix 104 to the client computer 102. The DNS suffix is part of an Internet protocol (IP) address of the domain controller and may comprise a name of a company using the intranet 108 and a category of a domain (e.g., commercial, educational or other). As an example, a DNS suffix may be "microsoft.com."

The device identification information is typically used for communication between a client computer and a server on an intranet network. It should be appreciated that the client computer 102 may or may not be joined to a domain network of the intranet 108. In order to join the domain network, the client computer 102 needs to be authenticated by the domain controller 112 by exchanging credentials.

Figure 1B:
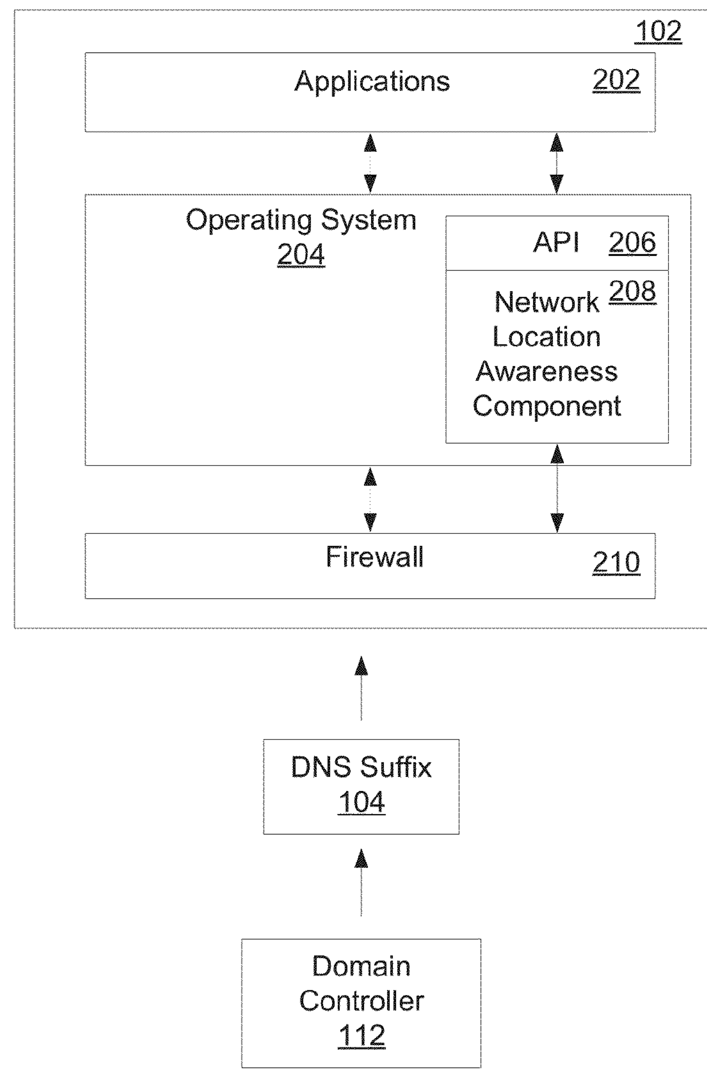
FIG. 1B is a block diagram illustrating a client computer that obtains a DNS suffix from a domain controller according to a prior art method of network identification.

FIG. 1B is a block diagram illustrating a client computer, such as, for example, the client computer 102, connected to a network, which obtains the DNS suffix 104 as part of device identification information from the domain controller 112 and uses it, together with other information, to generate a network signature identifying the network (e.g., the intranet 108).

The client computer 102 may comprise applications 202, an operating system 204, a firewall 210 and other components not shown for simplicity. The operating system 204 may comprise a component, shown by way of example only and not to limit the scope of the invention as a network location awareness (NLA) component 208, which may obtain the device identification information and generate a network identifier based on the DNS suffix 104. The network identifier may optionally be retained for future use. The NLA component 208 may also obtain and store other information, such as, for example, a type of the network and network configuration information. The NLA component 208 may be associated with an application programming interface (API) 206 to provide the network identifier and notice of changes in the network identifier to the applications 202, the firewall 210 and any other components of the client computer 102 which may require the network identifier for their operation.

The applications 202 may utilize a functionality (e.g., provided by a user interface) that allows receiving an input from a user of the client computer 102 indicating whether the user considers a new network (in particular, the network on which the client computer 102 does not have any information) safe. Furthermore, different categories of network safety may be assigned to the new network by the user.

The DNS suffix identifying the domain controller 112 can be guessed outside the intranet 108, for example, by a malicious attacker within the unsecured network 114. Consequently, the NLA component 208 can be "spoofed" into generating a network signature that matches the signature of a secure network when a client computer is connected to another, possibly unsecured, network, which may compromise secure identification of the intranet 108. The DNS suffix, IP address and other information, such as, for example, information used for mutual authentication of a client computer and a server or other devices on the network, may be referred to as low entropy information, which indicates that this information can be guessed or is obtainable outside the network. Therefore, using the low entropy information to generate the network signature may provide a security breach whereby a malicious attacker can "spoof" the network. The network "spoofing" may include guessing low entropy information (e.g., a DNS suffix) used by the NLA component 208 to generate a network signature and providing this information to a client computer connected to a network different from the network being "spoofed." As a result, the client computer may erroneously determine that it is connected to the network being "spoofed."

False network identification presents a particular problem for a mobile computing device that is configured to operate with more permissive security settings when on an intranet than when on an unsecured network.

Figure 1C:
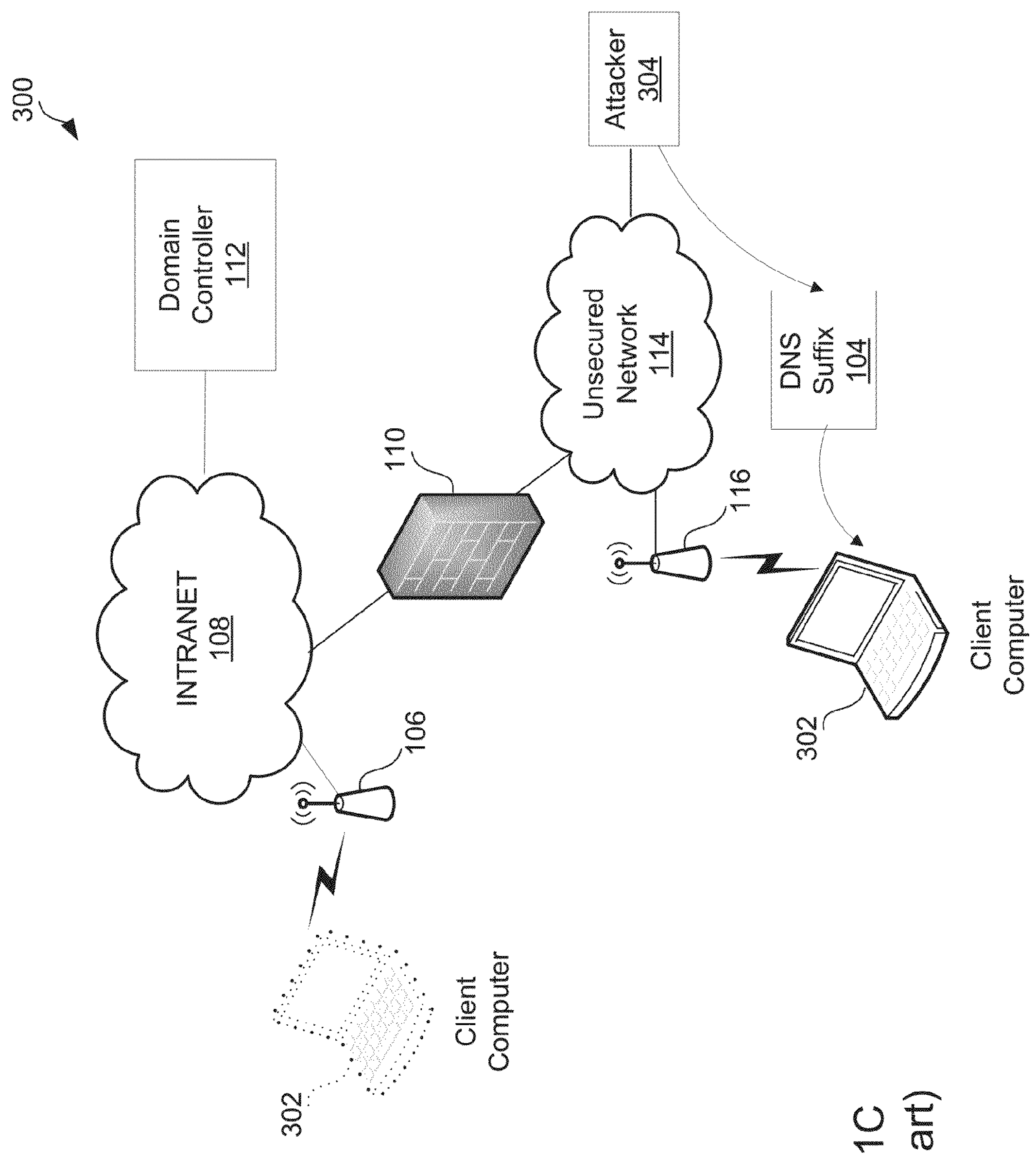
FIG. 1C is a schematic diagram illustrating a system utilizing prior art network identification wherein an attacker "spoofs" an intranet network.

FIG. 1C is a schematic diagram illustrating a system 300 utilizing network identification wherein an attacker 304 "spoofs" the intranet 108. As discussed in connection with FIG. 1A, a client computer may be connected to a network. In the example illustrated in FIG. 1C, a client computer 302 has moved to and is shown connected to the unsecured network 114. For example, a user of the client computer 302 belonging to a domain in a corporate network (e.g., the intranet 108) may be located in an Internet café wherein an access to the unsecured network 114 is provided. The attacker 304 may guess the DNS suffix 104 intended to be used in identification of the intranet 108 and provide the DNS suffix 104 to the client computer 302. Therefore, a component in the client computer 302 (e.g., an NLA component or any other suitable component) may generate a network signature falsely indicating the client computer 302 is connected to the intranet 108, while in reality the client computer 302 is connected to the unsecured network 114. This situation may potentially cause harmful consequences. For example, the user of the client computer 302 may utilize an application or a service requiring a user password and/or other sensitive and confidential information (e.g., credit card information) that the user may provide only if the client computer 302 is on the secure intranet 108. When the intranet 108 is "spoofed" and the client computer 302 connected to the unsecured network 114 but an NLA component 408 (shown in FIG. 2) indicates the client computer 302 is connected to the intranet 108, the user, unaware of the "spoofing," may still enter the confidential personal information which may be intercepted by the malicious attacker or any other entity. Moreover, applications (e.g., a firewall) within the client computer 302 which require the network signature, may behave so that security of the client computer 302 is compromised.

However, using high entropy data characteristic of a secure network (i.e., information that is random or nearly random and is not obtainable outside a network) to generate a unique network identifier such as a network signature may provide an additional level of security to a network identification process. In some embodiments, a software component, such as an NLA component or any other suitable component, in a client computer may obtain the high entropy data and generate the network signature. The high entropy data may comprise one or more unique device identifiers and may be obtained as part of device identification information. The device identification information may be obtained as a result of parsing a network data block.

A network signature may be generated from one or more of the unique device identifiers and/or other information. For example, a combination of one or more of the unique device identifiers and/or other information may be used. In some embodiments, a complex combination (e.g., a hash or any other suitable function) may be used to generate the network signature. Because of the high entropy characteristics of the unique device identifiers, the network signature may provide secure identification of the network.

Figure 2:
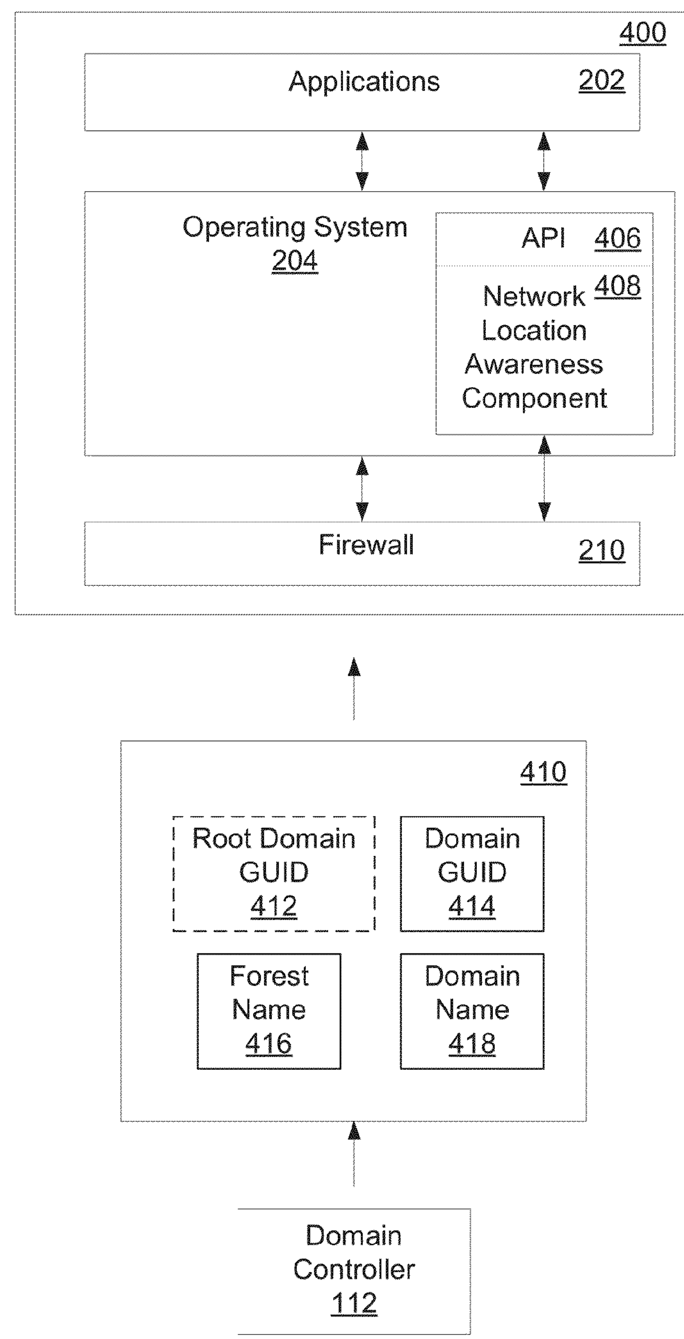
FIG. 2 is a block diagram illustrating a client computer that obtains a network data block from a domain controller according to some embodiments of the invention.

FIG. 2 is a block diagram illustrating a client computer 400 that obtains device identification information from a domain controller according to some embodiments of the invention. The client computer 400, connected to a network to be identified, includes components similar to the components included in the client computer 102. Additionally, the client computer 400 contains, in any suitable component, software or any other suitable implementation that allows requesting and receiving high entropy data. In the embodiment illustrated, the high entropy data may be device identification information obtained by the client computer 400 from a device controlling the network (e.g., the domain controller 112). The device identification information may include one or more unique device identifiers. The operating system 204 deployed by the client computer 400 may comprise a component, such as, for example, an NLA component 408 which may include software for requesting and receiving the device identification information from the domain controller 112. In some embodiments, the client computer 400 may deploy the Microsoft® Windows® Vista™ operating system. It should be appreciated that the NLA component 408 or any other suitable component capable of requesting and receiving the device identification information from the domain controller 112, generating a network signature and providing it to applications, may be located within any suitable component(s) of the client computer 400. In addition to the network signature, a type of a network may be identified by the NLA component 408, particularly, when the client computer 400 is connected to a network other than an intranet. It should also be appreciated that the software to receive the device identification information, generate the network signature and provide it to applications may be implemented in any suitable way and within one or more components.

An application programming interface (API), here shown as an API 406, may be used by the NLA component 408 to provide the network signature to components of the client computer 400 which may use the network signature in any suitable way. For example, the firewall 210 may utilize the network signature to determine whether the network is safe and may secure a connection if the network is unsecured.

Data used to generate the network signature may be obtained from the network. In the embodiment illustrated, the domain controller 112 may provide the device identification information in response to a request from the client computer 400. The request may be part of any suitable protocol. Also, a network data block 410 obtained by client computer 400 over the network may comprise the device identification information. In some embodiments, the device identification information may be parsed to obtain one or more unique device identifiers.

In some embodiments, the network data block 410 may comprise Active Directory domain identification data. In this example, the network data block 410 may comprise such device identification information as a Root Domain Globally Unique Identifier (Root Domain GUID) 412, a Domain Globally Unique Identifier (Domain GUID) 414, a Forest Name 416 and a Domain Name 418. Root Domain GUID 412 and Domain GUID 414 may be referred to as high entropy data thus being unique device identifiers. Root Domain GUID 412 may or may not be available as part of the network data block 410 and is shown by a dashed line. A GUID is a unique key used for device and software identity purposes and may be, for example, a 128-bit random number. It should be appreciated that other information, such as, for example, a Media Access Control (MAC) address, a serial number, a random number other than a GUID or any other suitable data, can be used as unique device identifiers identifying a device controlling a network, if this information is not easily guessed and is not obtainable outside the network.

The network signature may be generated from one or more of the unique device identifiers and/or other information. The specific approach for generating the network signature may depend on properties of the network and what information is available or can be obtained at a given time, for example, because of network errors or inability to reach a domain controller. The network signature generation may also depend on authentication history of the client computer.

Figure 3A:
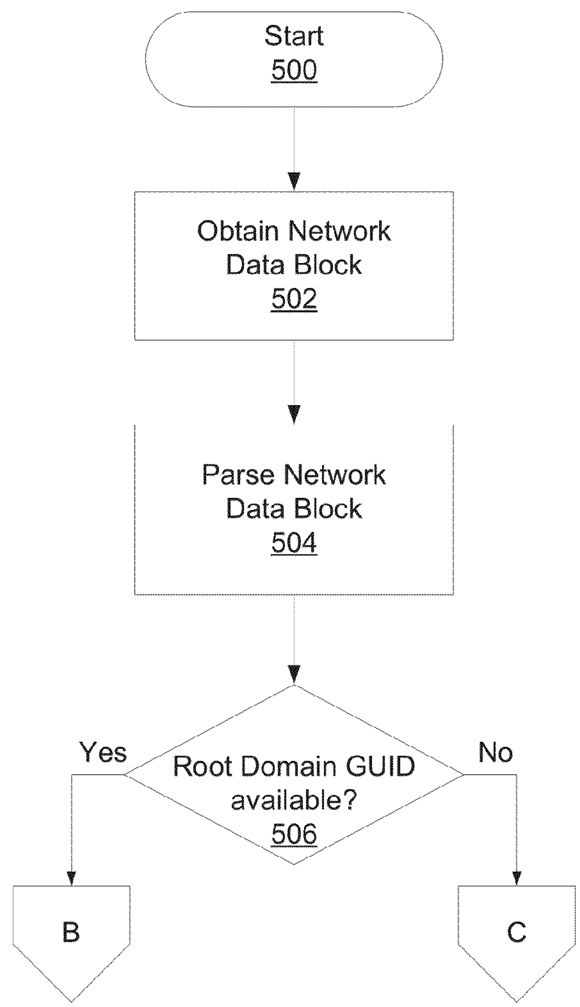
FIGS. 3A-3C are flowcharts illustrating a method of network identification according to some embodiments of the invention.
Figure 3B:
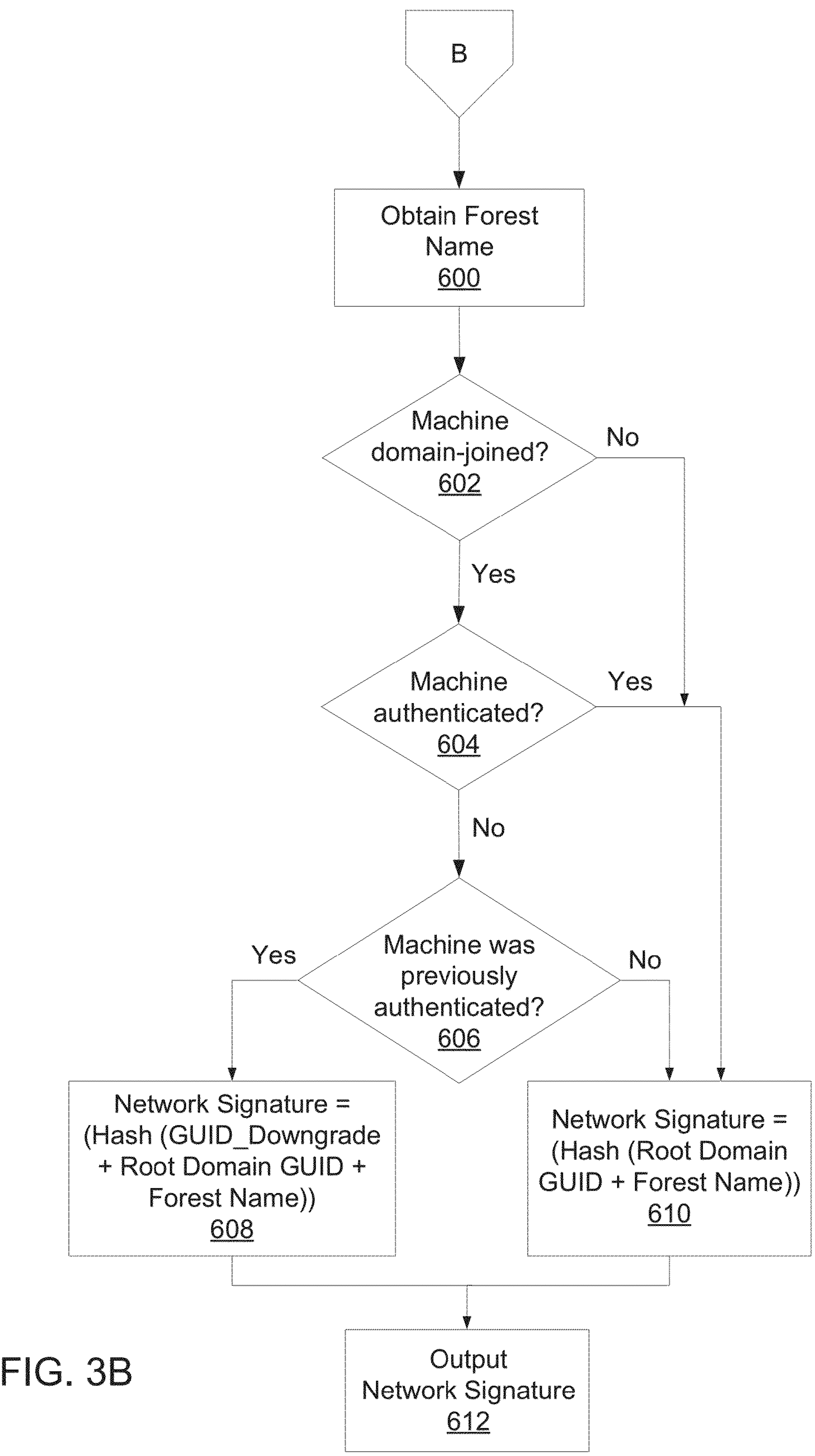
Figure 3C:
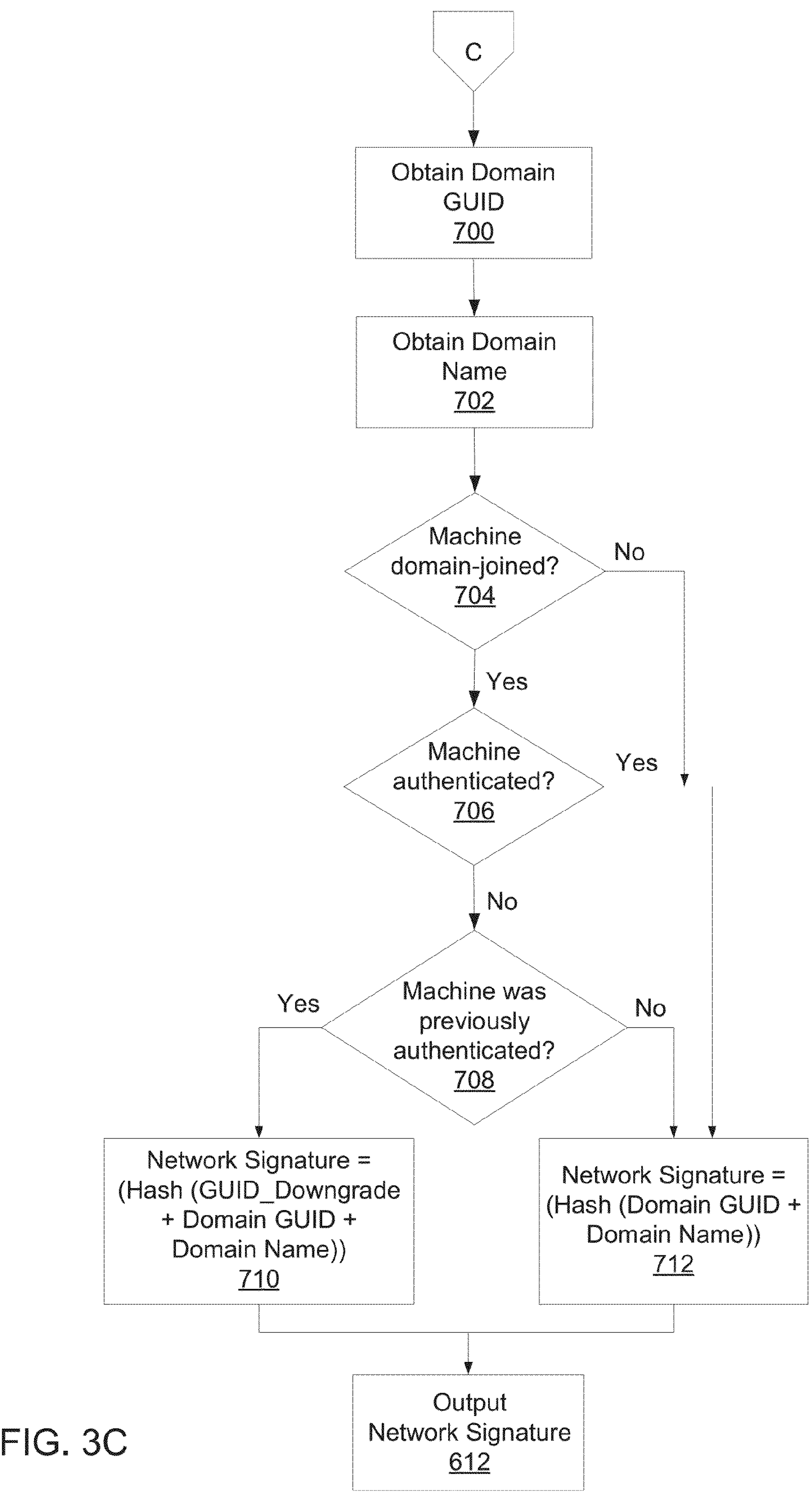

FIGS. 3A-3C are flowcharts illustrating a method of network identification whereby a network signature is generated according to some embodiments. The process starts with block 500, when a client computer or any other suitable device implementing network identification functionality starts up, or connects to the network, or at any other suitable time. For example, the process may start every time the client computer prompts a device controlling the network (e.g., a device controller) for information identifying the device, which may occur at a predetermined time, for example, at periodic intervals. If certain information needed to generate the network signature is not available, a new network signature may be generated.

A network data block may be obtained at block 502. As discussed above, the network data block (i.e., the network data block 410) may comprise device identification information, such as, for example, Root Domain GUID, Domain GUID, Forest Name, and Domain Name. The Root Domain GUID and Domain GUID having high entropy characteristics may be referred to unique device identifiers. It should be appreciated that the device identification information above is given by way of example only and not to limit the scope of the invention and other device identification information, including high entropy data, may be obtained with the network data block or in any other suitable way as well. The process proceeds to a block 504, wherein the network data block may be parsed. Parsing allows extracting unique device identifiers from the device identification information.

Upon parsing the network data block, it may be determined, in decision block 506, whether Root Domain GUID is available as part of the device identification information. If the answer is affirmative, the process branches to block B which is followed by blocks illustrating, in FIG. 3B, further processing. Otherwise, the answer is "no" and the process branches to block C which is a starting block of a process described in connection with FIG. 3C.

FIG. 3B illustrates a method of generating the network signature according to an embodiment in which a Root Domain GUID is available. At first, Forest Name may be obtained at block 600. The process then continues to decision block 602 where it may be determined whether a machine (e.g., the client computer or any other suitable device) is domain-joined (e.g., joined to an intranet domain network).

If it has been determined, in decision block 602, that the machine is not domain-joined, the network signature may be generated as a hash of Root Domain GUID and Forest Name, in block 610. Other suitable functions may be used to generate the network signature as well. If the machine is domain-joined, the process proceeds to decision block 604, where it may be determined whether the machine is authenticated. If the answer is affirmative, the network signature may be generated as a hash of Root Domain GUID and Forest Name, in block 610. Otherwise, if the machine is not authenticated, the process continues to decision block 606 to determine whether the machine has been previously authenticated. If the answer is "yes," the network signature may be generated as a hash of a GUID (GUID_Downgrade), Root Domain GUID, and Forest Name, in block 608. GUID_Downgrade is used to change the value of Root Domain GUID, which could be previously obtained, thus instigating generation of a new network signature. If the machine has not been previously authenticated, the process branches to block 610, where the network signature may be generated as a hash of Root Domain GUID and Forest Name.

The network signature generated at both blocks 608 and 610 may be output at block 612 and used to identify the network. The network signature may be provided, for example, via an API coupled to NLA component, to applications in the client computer requiring the network signature for operation.

FIG. 3C illustrates a method of generating the network signature according to an embodiment wherein Root Domain GUID is not available. Domain GUID may be obtained at block 700, which may be followed by obtaining Domain Name, at block 702. The process then continues to decision block 704, where it may be determined whether the machine is domain-joined.

If in decision block 704 it has been determined that the machine is not domain-joined, the network signature may be generated as a hash of Domain GUID and Domain Name, in block 712. Other suitable functions may be used to generate the network signature as well. If the machine is domain-joined, the process proceeds to decision block 706, where it may be determined whether the machine is authenticated. If the answer is affirmative, the network signature may be generated as a hash of Domain GUID and Domain Name, in block 712. Otherwise, if the machine is not authenticated, the process continues to decision block 708 to determine whether the machine has been previously authenticated. If the answer is "yes," the network signature may be generated as a hash of a GUID (GUID_Downgrade), Domain GUID, and Domain Name, in block 710. As discussed above, GUID_Downgrade is used to change the value Root Domain GUID, which results in generating a new network signature. If the machine has not been previously authenticated, the network signature may be generated as a hash of Domain GUID and Domain Name, in block 712.

The network signature generated at both blocks 710 and 712 may be output at block 612 and used to identify the network. The network signature may be provided, for example, via an API coupled to an NLA component, to applications in the client computer. The generated network signature may be stored, for example, in an encrypted format, for future use. Any suitable encryption algorithm may be used to encrypt the network signature.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a particular computing device that includes at least one processor and memory and that is coupled to a network, the method comprising:

determining, by the particular computing device in communication with a domain controller coupled to the network, first information indicating whether or not the particular computing device is currently joined to a domain of the network that is controlled by the domain controller;

determining, by the particular computing device in communication with the domain controller coupled to the network and based on the first information indicating that the particular computing device is currently joined to the domain, second information indicating whether or not the particular computing device is currently authenticated by the domain controller;

determining, by the particular computing device in communication with the domain controller coupled to the network and based on the second information indicating that the particular computing device is not currently authenticated by the domain controller of the domain, whether or not the particular computing device was previously authenticated by the domain controller;

generating, by the particular computing device, a unique identifier of the network based on:

at least one high-entropy property of the network; and at least one of the first information, the second information, or the third information; and providing, by the particular computing device, the generated unique identifier of the network to a component on the particular computing device.

2. The method of claim 1 where the at least one high-entropy property is resistant to being guessed outside of the network.

3. The method of claim 1 where the at least one high-entropy property is resistant to being obtained outside of the network.

4. The method of claim 1 where the at least one high-entropy property comprises a globally unique identifier ("GUID") of the domain.

5. The method of claim 1 where the component is an application.

6. The method of claim 1 where the component is an operating system.

7. The method of claim 1 where the generated unique identifier is configured for uniquely identifying the network to the particular computing device.

8. At least one computer storage device comprising:

memory that comprises computer-executable instructions that, based on execution by a particular computing device, configure the particular computing device to:

determine, in communication with a domain controller coupled to the network, first information indicating whether or not the particular computing device is currently joined to a domain of the network that is controlled by the domain controller;

determine, in communication with the domain controller coupled to the network and based on the first information indicating that the particular computing device is currently joined to the domain, second information indicating whether or not the particular computing device is currently authenticated by a domain controller;

determine, in communication with the domain controller coupled to the network and based on the second information indicating that the particular computing device is not currently authenticated by the domain controller of the domain, whether or not the particular computing device was previously authenticated by the domain controller;

generate a unique identifier of the network based on:

at least one high-entropy property of the network; and at least one of the first information, the second information, or the third information; and provide the generated unique identifier of the network to a component on the particular computing device.

9. The at least one computer storage device of claim 8 where the at least one high-entropy property is resistant to being guessed outside of the network.

10. The at least one computer storage device of claim 8 where the at least one high-entropy property is resistant to being obtained outside of the network.

11. The at least one computer storage device of claim 8 where the at least one high-entropy property comprises a globally unique identifier ("GUID") of the domain.

12. The at least one computer storage device of claim 8 where the component is an application.

13. The at least one computer storage device of claim 8 where the component is an operating system.

14. The at least one computer storage device of claim 8 where the generated unique identifier is configured for uniquely identifying the network to the computing device.

15. A system comprising:

a particular computing device that includes at least one processor and memory;

the particular computing device configured to determine, in communication with a domain controller coupled to the network, first information indicating whether or not the particular computing device is currently joined to a domain of the network that is controlled by the domain controller;

the particular computing device configured to determine, in communication with the domain controller coupled to the network and based on the first information indicating that the particular computing device is currently joined to the domain, second information indicating whether or not the particular computing device is currently authenticated by the domain controller;

the particular computing device configured to determine, in communication with the domain controller coupled to the network and based on the second information indicating that the particular computing device is not currently authenticated by the domain controller of the domain, whether or not the particular computing device was previously authenticated by the domain controller;

a network location awareness component configured to generate, a unique identifier of the network based on:

at least one high-entropy property of the network; and at least one of the first information, the second information, or the third information; and the particular computing device configured to provide the generated unique identifier of the network to a component on the particular computing device.

16. The system of claim 15 where the at least one high-entropy property is resistant to being guessed outside of the network.

17. The system of claim 15 where the at least one high-entropy property comprises a globally unique identifier ("GUID") of the domain.

18. The system of claim 15 where the generated unique identifier is configured for uniquely identifying the network to the computing device.

19. The system of claim 15 where the at least one high-entropy property is resistant to being obtained outside of the network.

20. The system of claim 15 where the component is an application or an operating system.

* * * * *